United States Patent
Skibinski

(10) Patent No.: US 9,983,307 B2
(45) Date of Patent: May 29, 2018

(54) METHOD FOR PROVIDING INFORMATION ABOUT AT LEAST ONE OBJECT IN A SURROUNDING REGION OF A MOTOR VEHICLE AND SYSTEM

(71) Applicant: Audi AG, Ingolstadt (DE)

(72) Inventor: Sebastian Skibinski, Ingolstadt (DE)

(73) Assignee: Audi AG, Ingolstadt (DE)

(*) Notice: Subject to any disclaimer, the term of this patent is extended or adjusted under 35 U.S.C. 154(b) by 0 days. days.

(21) Appl. No.: 15/521,545

(22) PCT Filed: Jan. 20, 2016

(86) PCT No.: PCT/EP2016/000091
§ 371 (c)(1),
(2) Date: Apr. 24, 2017

(87) PCT Pub. No.: WO2016/120001
PCT Pub. Date: Aug. 4, 2016

(65) Prior Publication Data
US 2017/0307754 A1    Oct. 26, 2017

(30) Foreign Application Priority Data

Jan. 31, 2015    (DE) .................. 10 2015 001 247

(51) Int. Cl.
*G01S 13/93*    (2006.01)
*G01S 13/86*    (2006.01)
*G01S 13/88*    (2006.01)

(52) U.S. Cl.
CPC .......... *G01S 13/931* (2013.01); *G01S 13/867* (2013.01); *G01S 13/88* (2013.01); *G01S 2013/9353* (2013.01); *G01S 2013/9371* (2013.01)

(58) Field of Classification Search
CPC ...................................... G01S 13/867
(Continued)

(56) References Cited

U.S. PATENT DOCUMENTS 6,385,539 B1 * 5/2002 Wilson .............. G01C 21/30
340/905
8,751,150 B2    6/2014 Stählin
(Continued)

FOREIGN PATENT DOCUMENTS

DE          10041277 A1    5/2001
DE    102006052482 A1    5/2008
(Continued)

OTHER PUBLICATIONS

English-language abstract of German Patent Application Publication No. 10 2013 205 392 A1, published Oct. 2, 2014; 2 pages.
(Continued)

*Primary Examiner* — Marcus E Windrich
(74) *Attorney, Agent, or Firm* — Sterne, Kessler, Goldstein & Fox, PLLC

(57) ABSTRACT

A method for providing information about at least one object in a surrounding area of a motor vehicle of a vehicle fleet is provided. The information in the motor vehicle is detected and, together with position data of the motor vehicle is transmitted and provided to a traffic information collection device. The information having at least one first geographic location of the object and a second geographical position of the object is provided and the second geographical position is determined and provided depending on the first geographical position.

16 Claims, 3 Drawing Sheets

(58) Field of Classification Search
USPC .................................................... 342/70–72
See application file for complete search history.

(56) References Cited

U.S. PATENT DOCUMENTS

| | | | | |
|---|---|---|---|---|
| 9,437,053 | B2* | 9/2016 | Jenkins | G07C 5/008 |
| 9,721,471 | B2* | 8/2017 | Chen | G08G 1/167 |
| 2004/0167709 | A1* | 8/2004 | Smitherman | G01C 11/02 |
| | | | | 701/409 |
| 2007/0027583 | A1* | 2/2007 | Tamir | G06Q 30/0283 |
| | | | | 701/1 |
| 2008/0215231 | A1* | 9/2008 | Breed | G08G 1/161 |
| | | | | 701/117 |
| 2009/0224942 | A1* | 9/2009 | Goudy | G08G 1/096783 |
| | | | | 340/905 |
| 2010/0082564 | A1* | 4/2010 | Fernekes | G06F 17/30241 |
| | | | | 707/705 |
| 2012/0068860 | A1* | 3/2012 | Popovic | G08G 1/09626 |
| | | | | 340/905 |
| 2014/0028487 | A1* | 1/2014 | Ishimori | G01S 13/06 |
| | | | | 342/70 |
| 2015/0369613 | A1 | 12/2015 | Stadler | |
| 2016/0357802 | A1 | 12/2016 | Meschenmoser et al. | |
| 2017/0038466 | A1* | 2/2017 | Salmen | G01S 17/89 |

FOREIGN PATENT DOCUMENTS

| | | |
|---|---|---|
| DE | 102008012654 A1 | 3/2009 |
| DE | 102009008745 A1 | 8/2010 |
| DE | 102013001308 A1 | 7/2014 |
| DE | 102013205392 A1 | 10/2014 |
| WO | WO 2010/129192 A1 | 11/2010 |
| WO | WO 2011/047729 A1 | 4/2011 |
| WO | WO 2011/127226 A1 | 10/2011 |

OTHER PUBLICATIONS

English-language abstract of German Patent Application Publication No. 10 2009 008 745 A1, published Aug. 19, 2010; 2 pages.
International Search Report and Written Notice of the International Searching Authority directed to related International Patent Application No. PCT/EP2016/000091, dated Apr. 25, 2016, with attached English-language translation; 25 pages.
International Preliminary Report on Patentability directed to related International Patent Application No. PCT/EP2016/000091, dated Jan. 4, 2017, with attached English-language translation; 14 pages.

\* cited by examiner

METHOD FOR PROVIDING INFORMATION ABOUT AT LEAST ONE OBJECT IN A SURROUNDING REGION OF A MOTOR VEHICLE AND SYSTEM

TECHNICAL FIELD

The invention relates to a method for providing information via at least one object in a surrounding area of a motor vehicle of a vehicle fleet, wherein the information in the motor vehicle is detected and, together with position data of the motor vehicle, is transmitted and provided to a traffic information collection device. The invention also relates to a system with at least one motor vehicle of a vehicle fleet and a traffic information collection device.

BACKGROUND

Methods for providing information about at least one object in a surrounding area of a motor vehicle of a vehicle fleet are known from the prior art. Thus, DE 10 2013 205 392 A1 describes a method in which the information is stored in a database in the form of a surrounding area model with information of a high-resolution, highly accurate digital map. The digital map comprises a highly accurate road model describing the course of roadways and lanes, and information on the number and course of lanes, curve radii, slopes, intersections and similar characteristics. The surrounding area model comprises additional information about static objects such as information about the position and type of roadway and line markings, such as stop lines, pedestrian crossings, median strips, road edge markings and the like, the presence of edge constructions as well as their relevance and relative or absolute position, information about position and type of traffic signs, or information about the position, type and condition of light signal systems or variable traffic signs. In addition, DE10 2013 001 308 A1 discloses a method and a navigation device for providing information about a parking space. Finally, DE 10 2009 008 745 A1 discloses a method and a system for automatic traffic management.

BRIEF DESCRIPTION OF THE DRAWINGS/FIGURES

DETAILED DESCRIPTION

Figure 1:
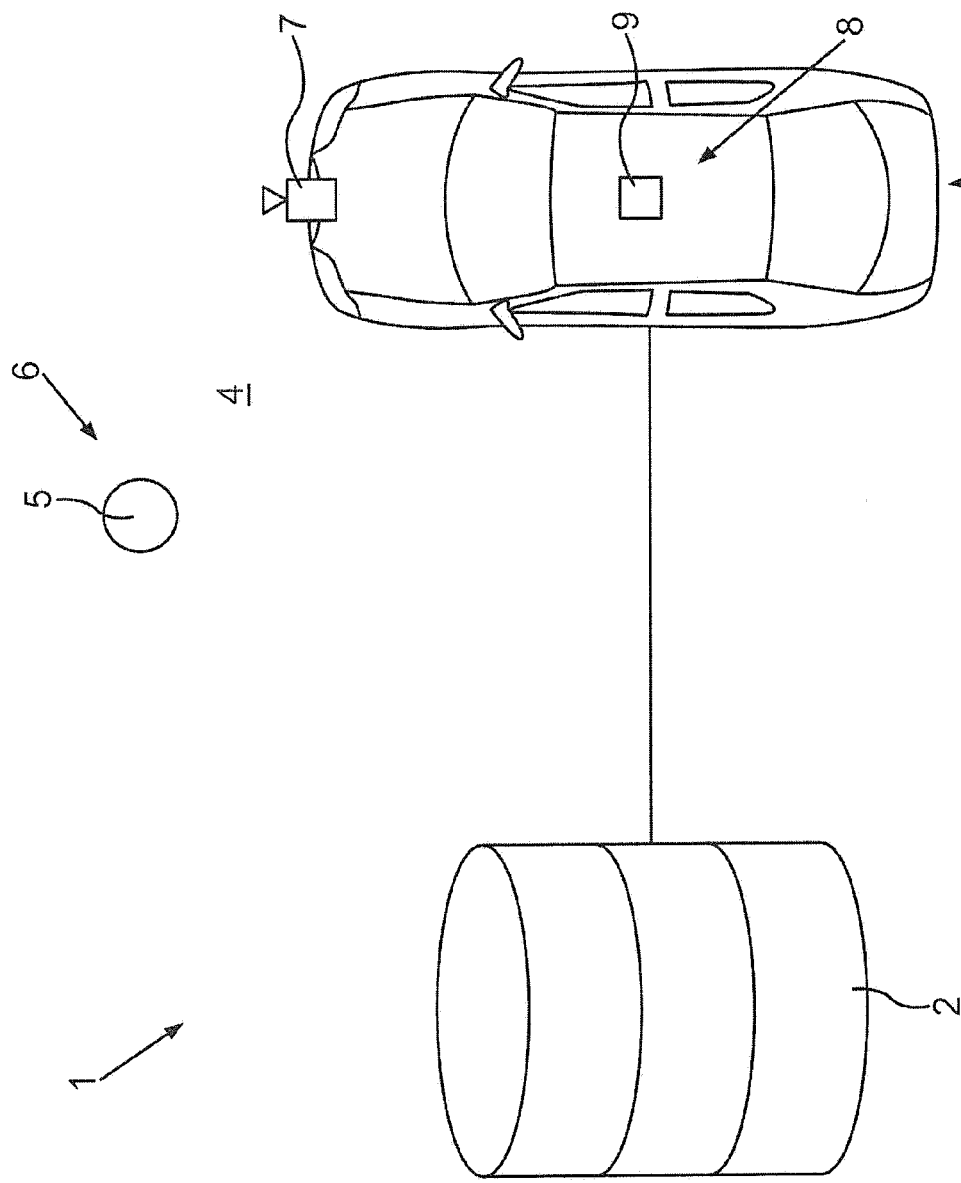
FIG. 1 illustrates a schematic representation of a system according to the invention with a traffic information collection device and a motor vehicle.

A disadvantage of the above-mentioned prior art is that the information is only trivially modeled by the surrounding area model.

It is a task of the invention to provide a method and a system with which the information about at least one object in the surroundings of the motor vehicle can be effectively provided by a traffic information collection device.

This task is solved according to the invention by a method and by a system with the features according to the respective independent claims.

In a method according to the invention, at least one object is provided in an surrounding area of a motor vehicle of a vehicle fleet. The information is recorded in the motor vehicle and, together with position data of the motor vehicle, is transmitted to a traffic information collection device and provided by the traffic information collection device. An essential idea of the invention is that the information is provided with at least a first geographical position of the object and a second geographical position of the object, and the second geographical position is determined and provided depending on the first geographical position.

The method, according to the invention, makes it possible to effectively provide the information about the object in the surrounding area.

This is made possible by the fact that the second geographical position is determined as a function of the first geographical position. This means that the second geographical position will be adjusted if the first geographical position changes. The first geographical position and the second geographical position can, for example, be designed as a geographical coordinate. For example, the geographical coordinate can describe a position in a grounded coordinate system, such as a UTM (Universal Transverse Mercator) coordinate system. The traffic information collection device preferably comprises a database. The first geographical position is, in particular, a primary attribute, whereas the second geographical position is, in particular, a secondary attribute. For example, the secondary attribute is adjusted if the primary attribute changes. The object is, in particular, a complex landmark, such as a roundabout. The complex landmark comprises of point-precise or point-shaped landmarks, such as, for example, the first geographical position and/or the second geographical position. In particular, the object is described parametrically with a graph. This means that the information about the object is modeled by the graph. The parametric description of the object includes attributes or parameters, such as the first geographical position and the second geographical position. The attributes are provided by the information and are modeled by means of the graph or described interconnected. In graph theory, the graph is an abstract structure that represents a set of attributes together with the connections between these attributes. The mathematical abstractions of the attributes are called nodes on the graph. The paired connections between nodes are called edges. The edges can be directed or undirected. In the present case, a circularly directed graph is preferably used to describe the information or to link the attributes of the information of the object to one another or to provide them as a function of one another. The attributes, such as the first geographical position and the second geographical position, are represented by the nodes of the graph. The edges of the graph thus show, in particular, a correlation of the attributes attached to the respective edges. Thus, the first geographical position is, in particular, a starting node of the graph, while a secondary attribute such as the second geographical position is a target node of the graph. In particular, the graph has no cycles.

In particular, it is intended to provide only absolute and relative coordinates. By means of the graph, more effective management of the information and more effective provision of the information can take place than if the first geographical position is indicated only absolutely and the second geographical position is only indicated relative to the first geographical position. Through the graph, a functional relationship, in the form of a mathematical model, can be described between the first geographical position and the second geographical position. Thus, an effective and complex correlation between the first geographical position and the second geographical position can be described by the graph.

For example, the object can be designed as a roundabout in the surrounding area. The first geographical position can then be, for example, a center point of the roundabout. The second geographical position can then be, for example, an auxiliary point which is required for the construction of a part of the roundabout. Therefore, if the first geographical position changes, the second geographical position also changes in dependence on the graph based on the dependence or mathematical model.

It is preferably provided that the first geographical position is determined independently of the second geographical position. Thus, the first geographical position does not depend in particular on the second geographical position. In particular, it is intended that the first geographical position is changed and thus the second geographical position is adapted. Furthermore, it is in particular not provided that the second geographical position is changed and the first geographical position thereby adapted. This corresponds in particular to the model of the directed graph. The directed graph specifies a direction in which the nodes of the graph can be traversed. An effective and error-reduced provision of the information by the directed graph is therefore advantageous.

Furthermore, it is preferably intended that the information is provided with a third geographical position, and the third geographical position is determined as a function of the first geographical position. The third geographical position, in particular analogously to the second geographical position, is likewise preferably a secondary attribute, which depends on the primary attribute, in particular the first geographical position. It is therefore advantageous that the modeling of the information is particularly versatile and that the second geographical position and the third geographical position can depend on a number of secondary attributes from the primary attribute. The description of the object, or the modeling of the information of the object, can thus be varied and the information can be provided effectively by, in particular, the traffic information collection device.

In one embodiment, it is preferably intended that the first geographical position is described by a center point of the object. Likewise, the first geographical position can be described, for example, by a focal point of the object. In particular, it is provided that the first geographical position is unambiguously assigned by the central point. Thus, the arrangement of the object in, for example, a grounded coordinate system can be precise. However, the central point of the object may also refer to central points of sub-objects of the object. In particular, however, it is intended that the central point is a clearly assignable reference point of the object.

In a further embodiment, it is preferably intended that an auxiliary point for the construction of a sub-object of the object is described by the second geographical position. For example, the auxiliary point can be used to describe a complete geometry, such as, for example, complex contours of sub-objects of the object. For example, a circle is defined by the center point of the circle and its radius. However, if the geometrical shape of the object becomes more complex, auxiliary points are usually used for the construction of the complex object. The complex extensions of the object are described here as the sub-objects. For example, the object can be present as a roundabout, and the sub-object can, for example, be a ramp of the roundabout. The advantage of the auxiliary point is also that more complex objects can be described and thus ultimately uniquely constructed.

In a further embodiment, it may be provided that the radius of a contour region of the sub-object is described by the auxiliary point. For example, the auxiliary point can specify from which position the radius of the contour region of the sub-object is to be constructed. The course of the contour of the sub-object can thus be unambiguously defined. By clearly defining the sub-object, the information can be effectively provided.

In particular, it is intended that the object is described as a traffic infrastructure element located outside the motor vehicle, in particular as a roundabout, in the surrounding area. The traffic infrastructure element can be designed, for example, as a traffic light and/or traffic sign and/or traffic island and/or roundabout and/or intersection and/or lane marking. It is therefore advantageous that various traffic infrastructure elements can provide the information which is modeled, stored in the traffic information collection device, and finally provided effectively.

In a further embodiment, it is preferably provided that a ramp to the roundabout and/or an exit from the roundabout is described by the sub-object. The ramp to the roundabout is thus, for example, the part of the roadway of the roundabout, on which the vehicles enter the roundabout. The exit from the roundabout thus describes the part of the road of the roundabout on which the vehicles depart from the roundabout. The sub-object thus enables an exact description of the object and thus an effective provision of the information.

Furthermore, it is preferably provided that the surrounding area is subdivided into sub-surrounding areas and the information is provided by the traffic information collection device depending on the sub-surrounding areas. Thereby, a method with restricted locality can be provided. This means, in particular, that the information is provided only for a sub-area of the object, and, for example, adjacent subareas are used to adapt the information provided by the object within the sub area. The sub-areas of the object are subdivided, in particular, by the sub-surrounding areas. For example, a grid can be applied to the earth surface, wherein each of the sub-surrounding areas corresponds to a grid section. The reduction of the data amounts for the processing of the information in the traffic information collection device is advantageous for the subdivision of the surrounding area into sub-surrounding areas. Thus, the information in the traffic information collection device can be more effectively processed and provided more effectively. Preferably, the sub-surrounding areas used to provide the information are determined by means of a 8-neighborhood. This means that, for example, a quadrangular sub-surrounding area is processed together with its adjacent 8-neighborhood sub-surrounding areas.

The invention also relates to a system with at least one motor vehicle of a vehicle fleet and a traffic information collection device, the system being designed to carry out a method according to the invention or an advantageous embodiment thereof.

The embodiments presented with reference to the method according to the invention and their advantages apply to the system according to the invention.

Additional features of the invention result from the claims, figures and the description of the figures. All the features and feature combinations mentioned above in the description, as well as the features and feature combinations mentioned below in the description of the drawing and/or mentioned only in the figures, can be used in the specified combination, but also in other combinations or alone without having to go beyond the scope of the invention. Thus, embodiments of the invention are also to be considered as being comprised and disclosed, which are not explicitly shown and explained in the figure, but which can result and can be generated from the described embodiments by separate feature combinations. Embodiments and feature combinations are also to be considered as being disclosed, which thus do not have all the features of an originally formulated independent claim.

Embodiments of the invention are described in the following with reference to the drawing.

Figure 2:
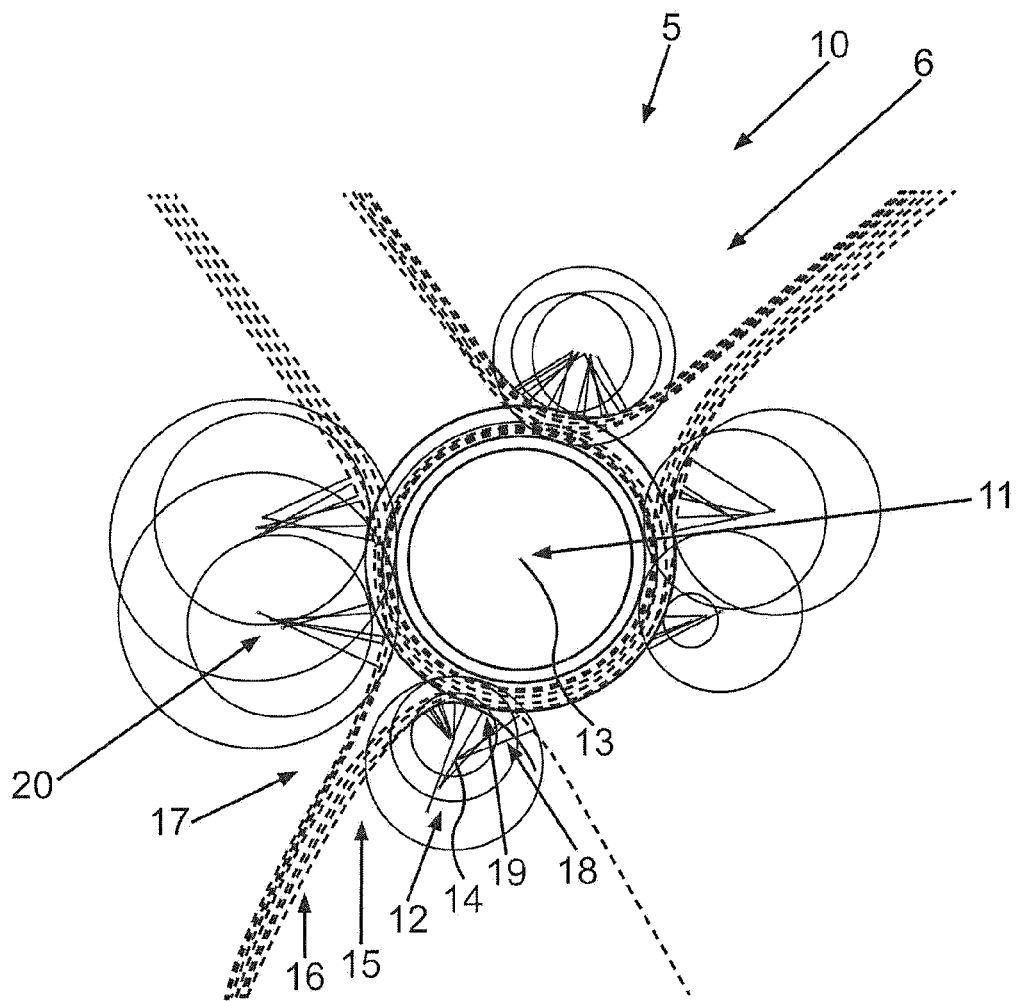
FIG. 2 illustrates a schematic representation of a roundabout in a surrounding area of the motor vehicle.
Figure 3:
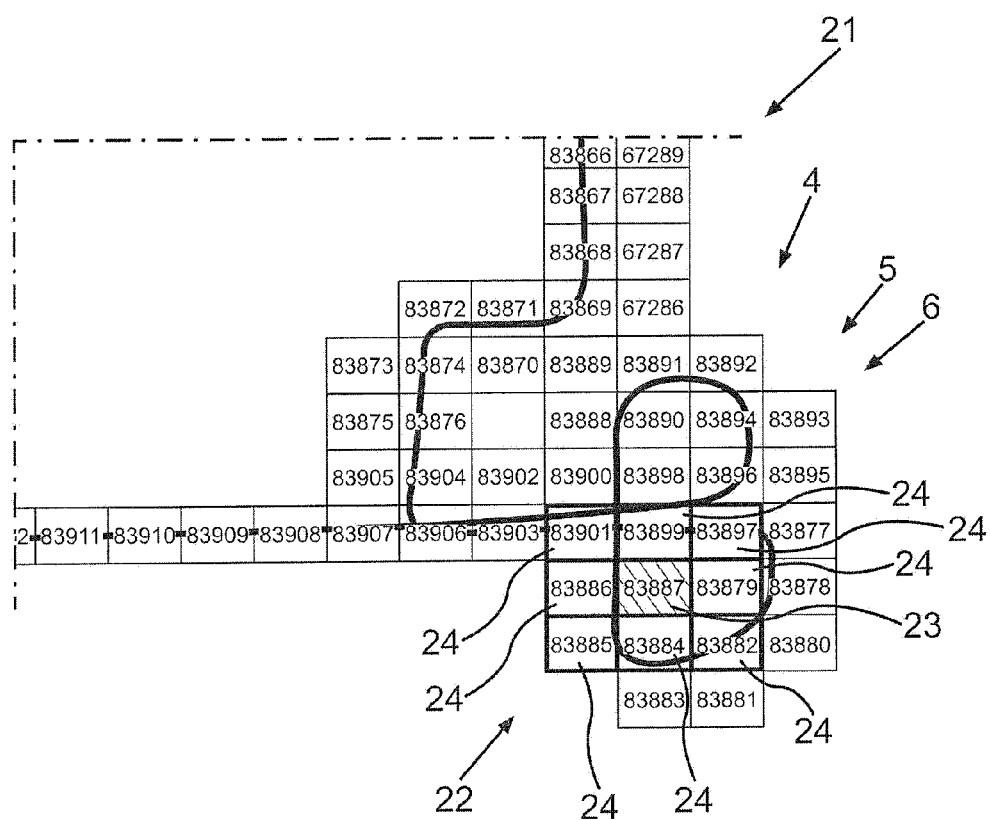
FIG. 3 illustrates a schematic representation of sub areas of the surrounding area.

The following is shown:

FIG. 1 is a schematic representation of a system according to the invention with a traffic information collection device and a motor vehicle;

FIG. 2 is a schematic representation of a roundabout in a surrounding area of the motor vehicle; and FIG. 3 is a schematic representation of sub areas of the surrounding area.

FIG. 1 schematically shows a system 1. In the exemplary embodiment system 1 comprises a traffic information collection device 2 and a motor vehicle 3. Object 5 is arranged in a surrounding area 4 of the motor vehicle 3. The traffic information collection device 2 is provided, in particular, as an external server with a database. The motor vehicle 3 is, in particular, part of a vehicle fleet which comprises a plurality of motor vehicles 3.

Information 6 about object 5 can, for example, be detected by a motor vehicle-based sensor 7 of the motor vehicle 3. Position data 8 of the motor vehicle 3 can, for example, be determined with a receiver 9 of the motor vehicle 3.

Thus according to FIG. 1, the information 6 about the object 5 is detected by means of the motor vehicle-based sensor 7, and is transmitted from the motor vehicle 3, in particular wireless, to the traffic information collection device 2. The information 6 can also be provided by the traffic information collection device 2 for, for example, individual vehicles of the vehicle fleet. By means of the information 6, for example a large-scale surrounding map, of the surrounding area 4 can be determined and/or adapted in the traffic information collection device 2.

The motor vehicle-based sensor 7 can, for example, be designed as a camera system and/or a radar system and/or a laser scanner and/or a Light Detection and Ranging (LIDAR) and/or an ultrasonic sensor. The receiver 9 is preferably a GNSS receiver (Global Navigation Satellite System) which can determine an absolute position in a ground coordinate system from motor vehicle 3. Thus, for example, a driving trajectory of motor vehicle 3 can also be determined.

FIG. 2 shows a roundabout 10 as object 5. From roundabout 10 information 6 is provided. The information 6 about the roundabout 10 comprises a first geographical position 11 and a second geographical position 12. The first geographical position 11 is designed as a center 13 of the roundabout 10 according to the embodiment. The second geographical position 12 is designed as an auxiliary point 14 according to the embodiment. The auxiliary point 14 is preferably provided for the construction of a sub-object 15 of the object 5. According to FIG. 2, the sub-object 15 is designed as a ramp 16 of the roundabout 10 and/or an exit 17 of the roundabout 10. Depending on the auxiliary point 14, for example, a radius 18 of a contour region 19 of the sub-object 15 can now be described. The information 6 is now provided in the traffic information collection device 2 as follows. The second geographical position (12) is determined dependent on the first geographical position (11). This means, for example, that the second geographical position will be adjusted if the first geographical position is changed. For example, the center point 13 of the roundabout 10 is detected and stored in the traffic information collection device. Furthermore, the auxiliary point 14 is detected and also stored in the traffic information collection device 2. The storage is effected in particular in such a way that the auxiliary point 14 or the second geographical position or the geographical coordinates of the auxiliary point 14 is stored and provided as a function of the center point 13.

The dependency of the second geographical position 12 from the first geographical position 11 is provided, in particular, by means of a non-circular directed graph. By means of the non-circular directed graph, the information 6 can be modeled in the traffic information collection device 2 in such a way that, when the first geographical position 11 is changed, the second geographic position 12 is adapted. The graph includes nodes and edges. The edges connect the nodes. The first geographical position 11 and the second geographical position 12 can be referred to as attributes. The first geographical position 11 is then, for example, a primary attribute, while the second geographical position 12 is a secondary attribute. The nodes of the graph are represented by the attributes of the information 6. The connection, which describes a mathematical function for the correlation between the attributes, is modeled by the edges.

A starting node of the graph is represented, in particular, by the primary attribute, while a target node of the graph is represented by a secondary attribute of the attributes. Thus, a non-circular or non-cyclical and directed dependency of attributes, such as, for example, the first geographical position 11 and/or the second geographical position 12, of the information 6 can be modeled. The information 6 can thereby be effectively managed in the traffic information collection device 2 and effectively provided by the traffic information collection device 2.

According to FIG. 2, the information 6 also comprises a third geographical position 20. According to the embodiment, the third geographical position 20 is described as a secondary attribute analogously to the second geographical position 12. Thus, the third geographical position 20, which is also described herein as one of the auxiliary points 14, is also determined as a function of the first geographical position 11. The third geographical position 20 can depend on the second geographical position 12. Alternatively, the second geographical position 12 can depend on the third geographical position 20. However, the third geographical position 20 can also be independent of the second geographical position 12.

According to the embodiment, the attributes of the information 6 are fused. The fusion takes place by means of a fusion algorithm. By means of the fusion algorithm, an adaptive segmentation of the vehicle fleet data or of the information 6 can be carried out with respect to a fixed reference system, thus, for example, the ground-based reference system. By selecting an incremental fusion algorithm, for example a Kalmann filter, the fusion algorithm can be designed incrementally. In addition or alternatively, however, the fusion algorithm can also be designed as a non-incremental algorithm, as is the case, for example, with the use of an incremental factorization for solving a linear system of equations. In the fusion algorithm, the correlation between the attributes is realized by means of the edges of the graph. Here, for example, the secondary attributes are correlated with the primary attribute. A correlation between the secondary attributes is also possible. As already mentioned, the correlation of the attributes of the information 6, which comprises the landmarks to be fused, is modeled by means of a non-circular directed graph. By means of recursive calculation, the correlations in the fusion algorithm used can be considered.

Furthermore, a consideration of dynamically many secondary attributes can take place for each object 5 or landmark by means of the non-circular directed graph. For example, an arbitrary number of entry ramps 16 and/or exit ramps 17 and driveways and exits can be described for the roundabout 10. Thus, the number of secondary attributes can be dynamic because, for example, not all entry and exit ramps of the roundabout 10 can be detected by the motor vehicle 3.

FIG. 3 shows map 21, which can be generated and/or adapted and/or checked as a function of the information 6. Map 21 shows the surrounding area 4, which is subdivided into sub-surrounding areas 22 according to the embodiment. Thus, the information 6 is provided by a main sub-surrounding area 23. The information 6 of the main sub-surrounding area 23 is performed as a function of neighboring sub-surrounding areas 24 of the main sub-surrounding area 23. The neighboring sub-surrounding areas 24 are arranged in a 8-neighborhood around the main sub-surrounding area 23.

By dividing the surrounding area 4 into the sub-surrounding areas 22, smaller amounts of data of the information 6 can be provided and processing of the information 6 takes place more effectively and temporally faster than when the information 6 of the entire map 21 and/or of the entire surrounding area 4 is processed. By dividing the map 21 into the sub-surrounding areas 22, the method can be performed with restricted locality. It is thus possible to effectively process large amounts of data which are generated by the information 6 in the traffic information collection device 2.

The adaptive subdivision of areas or of the surrounding area 4 into subareas or sub-surrounding areas 22 can be applied as a preprocessing step and allows, for example, the splitting of a large optimization problem. The large optimization problem describes, in particular, the fusion of collective vehicle fleet data or the information 6. The adaptive subdivision divides the large optimization problem into simpler sub-problems with restricted locality and can be solved more effectively. The solution of the large optimization problem can occur, for example, online, i.e. at the same time, in particular simultaneously, for detecting the information 6, for example with a Kalman filter and/or offline, i.e. in a post-processing step following the detection of the information 6, for example with a mode of play of the least squares respectively. In addition, an offline method, for example with a hybrid approach, can be executed incrementally. In the hybrid method, for example, the solution of a linearized system of equations can be made offline by means of a QR factorization and can also be carried out online by means of an incremental QR factorization. Thus, for example, newly added equations are updated only proportionally in incremental QR factorization.

The adaptive subdivision achieves, in particular, a parallel processing and thus a more effective processing of the information 6.

The invention claimed is:

1. A method for providing information about an object in a surrounding area of a motor vehicle of a vehicle fleet, the method comprising:
   detecting the information by the motor vehicle; and
   providing the information together with position data of the motor vehicle to a traffic information collection device,
   wherein the information comprises at least a first geographical position of the object detected by a motor vehicle-based sensor and a second geographical position of the object and the information is provided by the motor vehicle, and wherein the second geographical position is determined and provided as a function of the first geographical position, and
   wherein the second geographical position comprises an auxiliary point for construction of a sub-object of the object and the auxiliary point comprises a radius of a contour region of the sub-object.

2. The method of claim 1, further comprising:
   determining the first geographical position independently of the second geographical position.

3. The method of claim 1, further comprising:
   providing the information with a third geographical position, the third geographical position is determined as a second function of the first geographical position.

4. The method of claim 1, wherein the first geographical position comprises a center point of the object.

5. The method of claim 1, wherein the object comprises a vehicle infrastructure element located outside the motor vehicle in the surrounding area.

6. The method of claim 5, wherein the vehicle infrastructure element comprises a roundabout and the sub-object of the vehicle infrastructure element comprises an entry of the roundabout or an exit of the roundabout.

7. The method of claim 1, wherein the surrounding area is subdivided into sub-surrounding areas, and the information is provided to the traffic information collection device as a second function of the sub-surrounding areas.

8. A system comprising:
   a traffic information collection device; and
   a motor vehicle of a vehicle fleet, wherein the system is configured to:
      detect, by the motor vehicle, information about an object in a surrounding area of the motor vehicle; and
      provide, by the motor vehicle, the information together with position data of the motor vehicle to the traffic information collection device,
   wherein the information comprises at least a first geographical position of the object detected by a motor vehicle-based sensor and a second geographical position of the object, and wherein the second geographical position is determined and provided as a function of the first geographical position, and
   wherein the second geographical position comprises an auxiliary point for construction of a sub-object of the object and the auxiliary point comprises a radius of a contour region of the sub-object.

9. The system of claim 8, wherein the system is further configured to determine the first geographical position independently of the second geographical position.

10. The system of claim 8, wherein the system is further configured to provide the information with a third geographical position, wherein the third geographical position is determined as a second function of the first geographical position.

11. The system of claim 8, wherein the first geographical position comprises a center point of the object.

12. The system of claim 8, wherein the object comprises a vehicle infrastructure element located outside the motor vehicle in the surrounding area.

13. The system of claim 12, wherein the vehicle infrastructure element comprises a roundabout and the sub-object of the vehicle infrastructure element comprises an entry of the roundabout or an exit of the roundabout.

14. The system of claim 8, wherein the surrounding area is subdivided into sub-surrounding areas, and the information is provided to the traffic information collection device as a second function of the sub-surrounding areas.

15. The system of claim 8, wherein the information is detected by the motor vehicle-based sensor of the motor vehicle.

16. The method of claim 1, wherein the information is detected by the motor vehicle-based sensor of the motor vehicle and the information together with the position data of the motor vehicle are provided by the motor vehicle to the traffic information collection device.

\* \* \* \* \*